United States Patent [19]

Gottsegen

[11] 4,103,411

[45] Aug. 1, 1978

[54] BLOW MOLDING METHOD

[76] Inventor: Marten Gottsegen, 1212 Lake Shore Dr., Chicago, Ill. 60610

[21] Appl. No.: 716,927

[22] Filed: Aug. 23, 1976

Related U.S. Application Data

[63] Continuation of Ser. No. 537,288, Dec. 30, 1974, abandoned.

[51] Int. Cl.² .................... B23P 17/00; B29H 7/04
[52] U.S. Cl. ................................. 29/416; 29/453;
264/150; 264/152; 264/98
[58] Field of Search .............. 29/412, 416, 450, 453;
215/1 C; 264/89, 94, 96–99, 152, 150, 157, 159;
425/296, 302 B, 387 B, DIG. 214

[56] References Cited

U.S. PATENT DOCUMENTS

| | | | |
|---|---|---|---|
| 3,004,285 | 10/1961 | Hagen | 29/412 X |
| 3,198,375 | 8/1965 | Hunter | 220/60 |
| 3,214,830 | 11/1965 | Piker | 29/416 |
| 3,295,706 | 1/1967 | McKeekin | 215/1 C |
| 3,304,603 | 2/1967 | Piker | 29/416 |
| 3,428,722 | 2/1969 | Chittenden et al. | 264/98 |
| 3,457,590 | 7/1969 | Dittmann | 264/159 X |
| 3,862,698 | 1/1975 | Hafele | 264/159 X |

*Primary Examiner*—Victor A. DiPalma
*Attorney, Agent, or Firm*—Jacques M. Dulin

[57] ABSTRACT

Method and apparatus for blow molding double-walled containers from thermoplastic polymers in which the inner and outer container parts are simultaneously molded in a single tandem mold in the same molding cycle to produce special single-piece molded container intermediates. The intermediate is then cut apart along specially provided cut lines to provide a continuous inner container and a multipiece outer container in which the inner container nests. Loose, molded or batt-type insulation may be employed in annular space between the outer shell and the inner container. The outer container parts, bottom and top, are designed to snap-fit together. A carrying or pouring handle may optionally be molded into the outer shell part, or spout to the inner, or they may be added as separate pieces.

13 Claims, 7 Drawing Figures

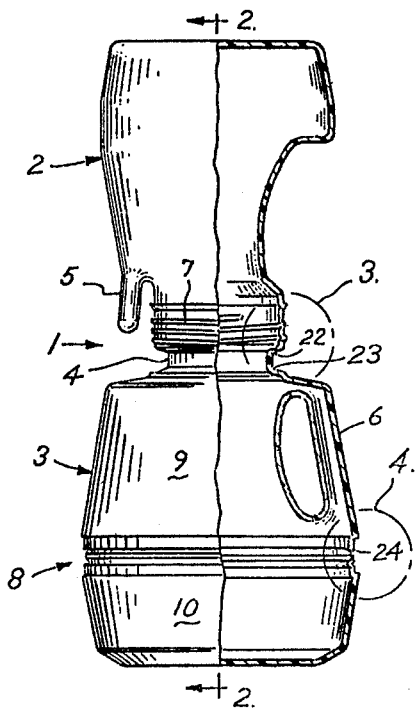
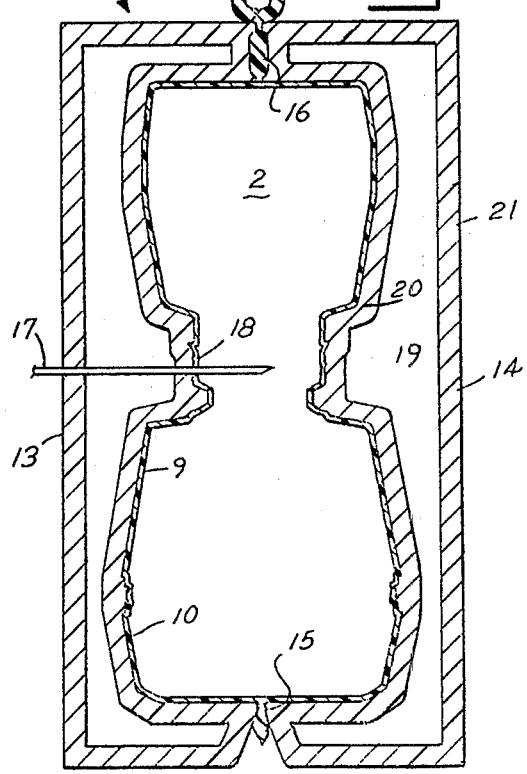
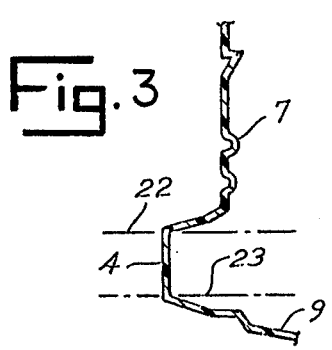
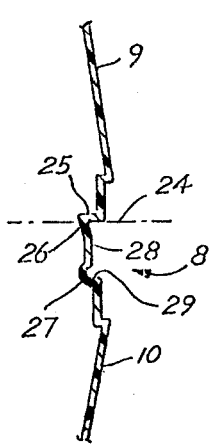
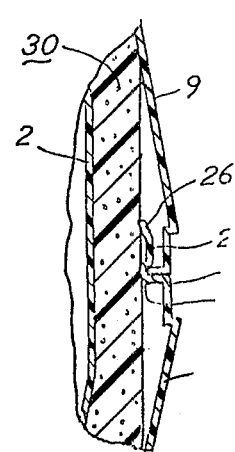

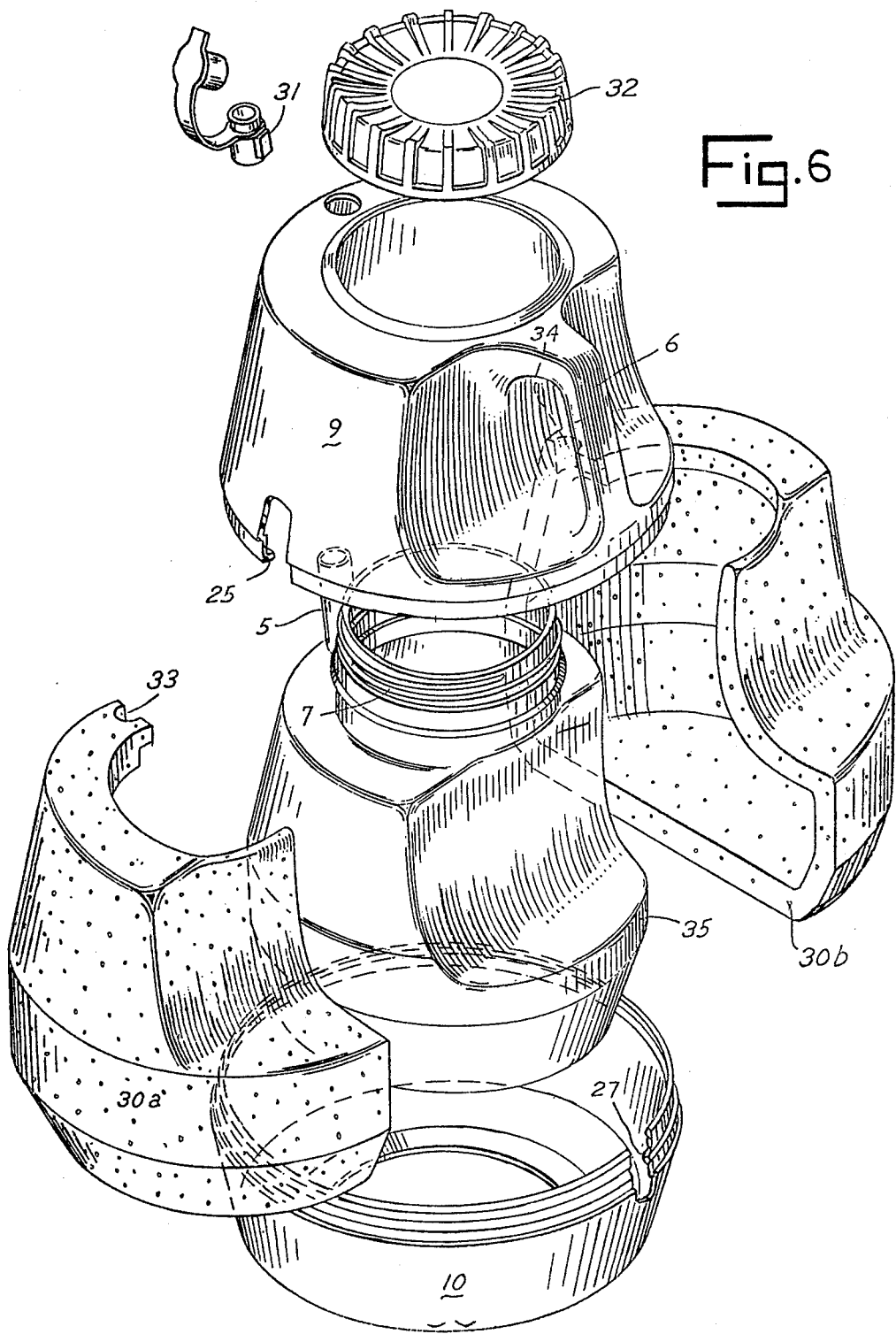

BLOW MOLDING METHOD

This is a continuation of application Ser. No. 537,288 filed Dec. 30, 1974, now abandoned.

Field

This application relates to the field of container design and manufacture, particularly to thermoplastic materials of the type which are blow molded, and more particularly to multi-part containers having an inner container and an outer shell spaced outwardly therefrom, with insulation therebetween. The principles are, however, applicable to molding any type of containers where containers of differing size are desired.

BACKGROUND

Blow molding of thermoplastics is a highly developed art involving generally forming a melt of a thermoplastic polymer, for example a polyolefin such as polyethylene or polypropylene, and extruding it as a tube in a vertically downward direction. The tube is extruded for a length sufficient to form a container, and a special mold is closed around the tube, pinching closed and cutting off both the top and bottom. A hollow needle is then inserted through one wall of the plastic tube and a gas under pressure applied. The pressure causes the soft, hot plastic to expand outwardly to conform to the mold shape. The mold is cooled sufficiently to permit the plastic to retain its shape, and thereafter the mold opens and the object removed. The cycle is then repeated.

Tandem molds for blowing two bottles simultaneously are shown in Dittman U.S. Pat. No. 3,457,590. However, this approach merely involves producing two bottles of the same size and shape in a single cycle. The molds are not designed to provide for multi-part containers having an inner container part spaced inwardly from an outer shell. Separate molds on separate machines would be needed. Further, for each defective part, two or more replacements would be blown at each pass, and thus with the Dittman type of tandem mold, it is more difficult to match and collate for assembly the required number of parts for multi-part containers.

Multi-part containers are shown for example in Piker U.S. Pat. Nos. 3,298,554; 3,214,830; 3,304,603; 3,132,759; 3,356,243; 3,313,438; and 3,467,562. All of these involve separately molding the inner container, removing it from a mold, and trimming it for assembly. The outer two-piece container shell is also blown separately in a different mold, and cut apart along special lines so a shell bottom snap fits into the top. The separately molded and cut parts are then assembled with foamed-in-place or fiberglass batt insulation.

THE INVENTION

Objects

It is among the objects of this invention to provide an improved method of making double-walled containers, particularly of the thermoplastic blow-molded type.

It is another object to provide a special tandem mold having interconnected cavities of differing sizes to permit simultaneous formation of containers of different sizes, for example, the inner container and outer shell part of a double-walled container.

It is another object to provide as an article of manufacture a blow-molded "intermediate" which as a single unit provides all the parts for a double-walled container, or pairs in a set of related-sized containers.

It is another object to provide an improved method of forming thermoplastic double-walled containers which includes simultaneously blow molding in a single mold the inner vessel and outer shell parts as a one-piece intermediate which is then cut apart and assembled.

It is another object to provide an improved blow-molded, one-piece intermediate for double-walled containers, or related-size container pairs, which permits simplified handling and assembly of matched parts.

Still further objects will be evident from the description and drawings which follow.

Figures:

The drawings contain several figures in which like or similar parts are numbered the same or similarly.

FIG. 1 illustrates partly in section a one-piece subassembly or "intermediate" of a blow-molded, double-walled container as it is produced in the tandem mold of FIG. 2.

FIG. 2 shows in section a tandem mold along line 2—2 of FIG. 1 for producing a one-piece subassembly at the point in the cycle when the plastic is expanded to the mold walls.

FIG. 3 is an enlarged section of the common neck portion of FIG. 1 illustrating the section to be removed.

FIG. 4 is an enlarged section of the outer shell portion of the subassembly of FIG. 1 showing the cut line to separate the upper from lower portions of the outer shell, and showing the special wall configuration to produce a snap-fit of the outer shell parts.

FIG. 5 shows an enlarged cross-section of a portion of the wall of a double-wall container and the snap-fit of the outer shell parts in the assembled condition.

FIG. 6 is an exploded perspective view of a container made in accordance with the principles of this invention.

SUMMARY

Figure 7:
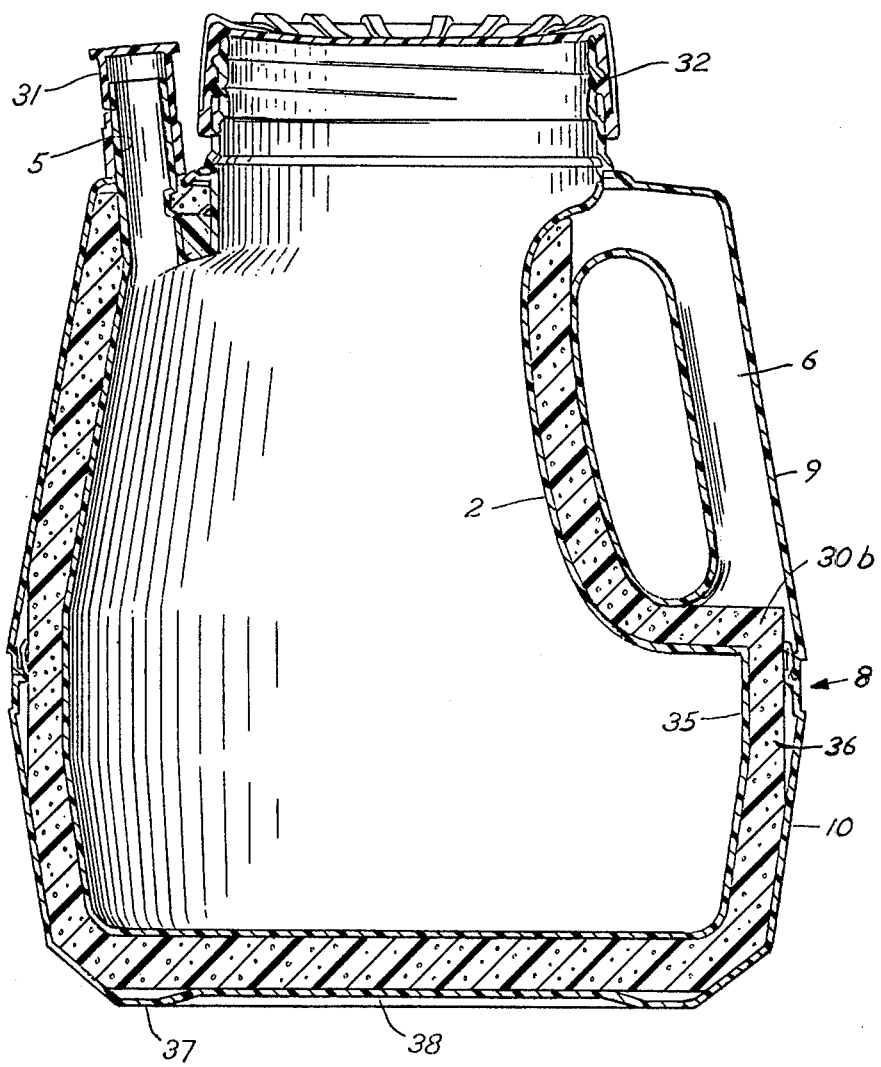
FIG. 7 is a cross-section view of the container of FIG. 6 in the assembled condition.

A tandem mold for thermoplastic blow molding is provided with one cavity smaller than the other with the wall configuration adapted so that the smaller cavity permits forming the inner vessel of a double-walled container, while the larger cavity forms the outer shell. The vessel-forming cavities are joined at the neck. The wall of the outer shell is designed so that one or more cuts therethrough forms a lower and an upper portion that snap-fit together.

The method involves melting, extruding, and blowing a one-piece intermediate subassembly in the mold. The one-piece assembly is removed from the mold and may be handled, stored or transported as such without loss or mismatching of one or more of the vessel parts necessary for assembly of the finished double-walled container. Costs attendant to such loss or mismatching are reduced. Further, damage to one part does not involve remanufacture of more than necessary of that particular part as is the case with current tandem molds.

The subassembly is cut apart at the neck to separate the inner vessel from the outer shell subassembly. The outer shell is cut, typically along a single line to form a top portion and a bottom portion. The outer shell subassembly walls are adapted to provide for snap-fit interengagement of the bottom to the top. To assemble the finished container, insulation may be wrapped, placed or formed around the inner container, and this partial assembly is then placed in the bottom portion of the outer shell. The top portion of the outer shell is then snap-fit over the bottom and inner container. Optionally, the insulation may be formed in place by in-situ filling or foaming during or after assembly.

The intermediate subassembly may have provision for a spout and/or carrying or pouring handle. A handle may be added as a separate part; for example, a strap carrying handle may be a separate part secured to the outer shell, particularly in smaller vessels, e.g., half-gallon and quart sizes, or smaller.

The invention is not restricted to double-walled containers (nor to containers per se only), but may be applied to any graduated-sized objects, such as nesting vessels or the like, and generally to toys, tools, utensils, appliances, furniture and vehicles or parts thereof. Thermoplastics of various types may be used in the method and molds of this invention to form the useful intermediates and final products. Particularly suited are thermoplastic polymers, copolymers, terpolymers, or multi-component polymers. Preferred are the olefin-type polymers, particularly polyethylenes and polypropylene.

DETAILED DESCRIPTION

The detailed description of the preferred embodiments shown in the drawings are by way of illustration and not by way of limitation of the principles of the instant inventions.

FIG. 1 is a plan view, partly in section, showing an intermediate subassembly 1 of a polyolefin container blow molded in the mold of this invention by the process of this invention. Inner vessel 2 is joined to outer shell assembly 3 at a common neck portion 4, which is shown in more detail in FIG. 3. Shown as optional features are a separate spout 5 molded into the inner vessel, and a pouring or carrying handle 6, molded as part of the outer shell 3.

Threads 7 are also optionally molded as part of the inner vessel neck to receive a screw-type cap. Other types of caps may be employed if desired, such as snap-fit or friction fit over-caps or lids. Likewise, the handle may be omitted entirely, or be provided as a separate part, e.g., a strap-type carrying handle attached with snap-fit type button-and-grommet assemblies, or the like.

Outer shell 3 also has molded therein a recessed area 8, shown in more detail in FIGS. 4 and 5, defining an upper shell portion 9 (a top), and a lower shell portion 10 (a bottom). These aid in the assembly of the finished double-walled container.

It should be noted that the inner vessel portion 2 is smaller than the outer shell 3 to fit therein, and all the container-forming parts 2, 3, 9 and 10 are molded as a single unit. This unit may be handled, stored and transported without loss of parts or mismatching of parts sizes. In container assembly it is essential to have the correct number of the correct-sized parts to make up the proper number of the container units. It is apparent that this subassembly intermediate facilitates that collation. One subassembly counting operation simultaneously inventories all parts. Further, if there is a shortage in units, one molding cycle provides all parts from a single machine, without excess or odd lots of inners, bottoms or tops.

FIG. 2 shows a special tandem mold 11 in accord with this invention in section taken along the line 2–2 of FIG. 1. Polyolefin is extruded from a head (not shown) above the mold in the form of a tube 12. The tube descends between open mold halves to a length slightly longer than the mold. The mold halves 13, 14 are then closed, pinching the tube closed at bottom 15 and top 16. These portions are later cut off as excess flashing.

Hollow injection needle or tube 17 is passed through the polyolefin wall 18, and a blowing fluid such as compressed air, an inert gas, steam or the like is introduced through the tube. The hot plastic tube expands to conform to the heated mold wall shape shown in FIG. 2, forming simultaneously in a single cycle all the container forming parts: inner vessel 2, outer top 9 and outer bottom 10.

The mold is then cooled by circulating cooling fluid, such as water, through the annular space 19 between the inner mold wall 20 and outer wall 21. Other conventional parts of the mold are not shown for simplicity, e.g., reciprocating means, coolant and heating fluid inlets and outlets, polyolefin heaters, extrusion means and the like.

FIG. 3 shows in enlarged cross-section the neck and threads portion of the subassembly. To assemble the finished double-walled container, the common neck portion 4 is removed by cutting the plastic in the plane of line 22. This severs the inner vessel 2 from the outer shell 3. The excess is removed from outer shell 3 by cutting the plastic in the plane of line 23. The cuts may be made simultaneously with a double knife. It should be understood that the width of the common neck portion 4 may be varied as desired, and where parts and mold configurations permit, the width is reduced so that a single cut serves to sever the inner and outer container parts.

FIGS. 4 and 5 are enlarged views in section of the snap-fit locking portion 8 of the outer shell. The upper portion 9 may be separated from the bottom portion 10 by cutting along line 24. The top portion thus has a planar, annular, inwardly directed rim 25 which can slide downwardly over a tapered portion 26 into groove 27 in the bottom portion. An intermediate raised ridge 28 prevents upward movement of the upper shell portion from the bottom. Likewise, a bottom shoulder 29 prevents further downward movement of the upper shell. The cut line plane 24 may optionally be parallel to the plane of the taper 26.

FIG. 5 shows the upper and lower shell locked together after first inserting the inner vessel 2 in, or wrapping the insulation 30 around it. The insulation can be provided in a thickness at that portion so the tapered portion 26 and groove 26 frictionally contact the insulation. This prevents the insulation from moving inside the annular space, and prevents unlocking of the upper and lower portion by limiting the inward radial movement of the taper 26, ridge 28 and groove 27.

FIG. 6 shows the double-walled container in an exploded perspective that illustrates the manner of assembly. Molded insulation in the form of two half-portions 30a and 30b are placed around the inner vessel 2, and placed into the bottom portion of the outer shell 10. The insulation shown is preformed, rigid, foamed-bead styrene, but may be a batt of insulation such as fiberglass. Alternatively, the inner vessel 2 may be placed into the bottom shell, insulating polymer placed therebetween, the upper shell part snapped into place by pressing downwardly, and the insulation material foamed in place. Spout cap 31 and lid 32 complete the assembly.

The insulation parts 30a and 30b are notched at 33 and 34 to receive the spout 5, when a spout is provided. The inner vessel 2 is flattened at 35 opposite the snap-fit outer shell lock to provide clearance for the finger 25 and groove 27. The volumetric size of the vessel 2 is chosen as desired, for example, quart, half-gallon, gallon, liter, half-liter and the like.

FIG. 7 shows the completed, assembled container. The handle 6 is hollow as formed by blow molding. When rigid preformed or batt-type insulation is used, the handle is not filled. When foamed-in-place insulation is used, the handle may be filled in part or entirely. The flattened portion 35 of the inner vessel and corresponding flattened area 36 of the insulation provide clearance for the lock 8. The bottom portion 10 may have a planar, annular ring portion 37 and recessed central disc 38 to provide a foot having an annular bearing surface.

The principles of this invention apply to blow molding any articles or objects having parts of differing size or interrelationship where one part is adapted to fit in a spaced relationship (spaced apart or interfitting) partly or wholly inside of at least one other (second) part, e.g., vessels, containers, toys, tools, utensils, vehicles, appliances, furniture and the like, in part or in their entirety. The method and mold permit simultaneous blow molding of the related parts with the advantages evident throughout.

It should be understood that various modifications within the scope of this invention can be made by one of ordinary skill in the art without departing from the spirit thereof. I therefore wish my invention to be defined by the scope of the appended claims as broadly as the prior art will permit, and in view of this specification if need be.

I claim:

1. In a method of blow molding thermoplastic articles having interrelated sized parts comprising the steps of melting a plastic, extruding a tube of the plastic melt into a mold, closing the mold on the extrudate, expanding the plastic extrudate in the mold by applying fluid pressure internally thereof to form an object, cooling the mold, and removing the blown object, the improvement which includes the steps of:
    (a) providing a tandem mold having a plurality of interconnected cavities;
    (b) said interconnected cavities being interrelated and of different sizes or/and shapes;
    (c) said interconnected cavities including:
        (i) a first cavity adapted to form a first part of an object which is adapted to fit inside a second part of said object, and
        (ii) a second cavity adapted to form said second object part;
        (iii) said first cavity being adapted to provide an annular space between said first and said second parts;
    (d) simultaneously expanding said plastic in both of said cavities to form interrelated parts of said object which form at least a part of a multi-part object;
    (e) separating said parts; and
    (f) interfitting said parts to form said object.

2. An improved blow-molding method as in claim 1 wherein said articles are parts of containers, toys, furniture, tools, appliances, vehicles, or utensils.

3. An improved blow-molding method as in claim 1 wherein:
    (a) said articles are double-walled vessels,
    (b) said first cavity is adapted to form an inner vessel and
    (c) said second cavity is adapted to form an outer shell.

4. An improved blow-molding method as in claim 3 wherein:
    (a) said mold is adapted to form said inner vessel joined at its neck to said outer shell.

5. An improved blow-molding method as in claim 4 wherein:
    (a) said inner vessel mold cavity is adapted to form a spout.

6. An improved blow-molding method as in claim 4 wherein:
    (a) said outer shell mold cavity is adapted to form an integral handle.

7. An improved blow-molding method as in claim 1 wherein:
    (a) said first and second mold cavities are adapted to form a pair of containers of related and differing volumetric quantities.

8. A method of assembly of blow-molded articles having a plurality of interelated parts comprising:
    (a) simultaneously blow molding at least two unitary plastic parts of differing size configuration to form a subassembly one of said parts forming a first part of an object which is adapted to fit inside another of said parts, and said interfitting parts being adapted to provide an annular space there between,
    (b) said parts being connected together by removable plastic,
    (c) retaining said parts throughout steps of handling and transport in the form of said subassembly,
    (d) separating said parts when preparing to assemble said article, and
    (e) assembling said parts to form said article.

9. An assembly method as in claim 8 wherein said article is selected from containers, toys, furniture, tools, appliances, vehicles and utensils.

10. An assembly method as in claim 9 wherein said article is a container having a neck.

11. An assembly method as in claim 10 wherein said container is a double-walled container, and said subassembly includes an inner vessel portion and an outer shell portion, as a single piece.

12. An assembly method as in claim 11 wherein said inner vessel and outer shell portions are joined at a common neck, and said portions are adapted to be severed from each other at said neck.

13. An assembly method as in claim 12 wherein said outer shell portion includes an upper portion and a bottom portion severable one from the other along a cut line, and having marginal areas adjacent said cut line adapted to form a snap-fit lock for interengagement of said portions upon said assembly.

* * * * *